3,463,604
RECOVERY OF MOLYBDENUM FROM ORGANIC SOLUTIONS USING AMMONIUM PHOSPHATE
Richard G. Tave, Philadelphia, Pa., assignor to Atlantic Richfield Company, Philadelphia, Pa., a corporation of Pennsylvania
No Drawing. Filed June 22, 1967, Ser. No. 647,908
Int. Cl. C22b 49/00
U.S. Cl. 23—22                           2 Claims

ABSTRACT OF THE DISCLOSURE

Method for the recovery of molybdenum from organic solutions of compounds thereof by precipitation with ammonium phosphate and recovery of the ammonium phosphomolybdate.

BACKGROUND OF THE INVENTION

Field of the invention

The present invention relates to a method for recovering molybdenum from process streams containing molybdenum dissolved in organic material, particularly from epoxidation reaction product residues by precipitating the molybdenum from the organic solution with aqueous ammonium phosphate and recovering the molybdenum in the form of the ammonium phosphomolybdate. The ammonium phosphomolybdate can, of course, be further processed by known methods to recover, ultimately, metallic molybdenum.

The prior art

An analytical technique is shown in the literature for the determination of phosphate by forming a heteropolymolybdate in an aqueous medium. The reaction is carried out under rather specific conditions:

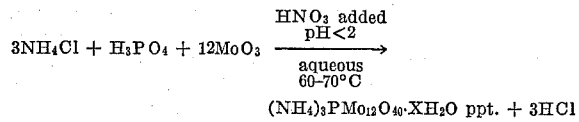

$$3NH_4Cl + H_3PO_4 + 12MoO_3 \xrightarrow[\substack{\text{aqueous}\\60-70°C}]{\substack{HNO_3 \text{ added}\\pH<2}} (NH_4)_3PMo_{12}O_{40} \cdot XH_2O \text{ ppt.} + 3HCl$$

Another method involves the formation of ammonium molybdate by addition of ammonium hydroxide to a solution of molybdenum trioxide. The solution is then acidified with nitric acid. The ammonium molybdate-nitric acid reagent is used for the precipitation of phosphate ion as ammonium phosphomolybdate, $(NH_4)_3PMo_{12}O_{40}$, from nitric acid solutions.

The present method of recovering molybdenum is particularly useful for recovering molybdenum from non-aqueous solutions, for example, in recovering molybdenum used as a catalyst in the epoxidation of olefinically unsaturated compounds to oxirane compounds with an organic hydroperoxide as the oxidizing agent. Such epoxidation processes are described in detail in Belgain Patent No. 674,076, dated June 20, 1966.

This method is most useful in the propylene epoxidation process described in the application of Harold A. Sorgenti filed of even date herewith and entitled "Molybdenum-Containing Catalyst Solutions and Method of Making and Using Same." In this application it is disclosed that a molybdenum-containing catalyst solution can be made by incorporating metallic molybdenum in a distillate bottoms fraction of a propylene epoxidation reaction product and thereafter heating the mixture to solubilize the molybdenum and produce the catalyst solution. This solution can be recycled to the process. Since only a portion of the bottoms fraction is needed to produce catalyst for recycle, it is necessary for economic reasons to recover the used molybdenum catalyst from the purge bottoms stream.

SUMMARY OF THE INVENTION

In accordance with the present invention molybdenum is recovered as ammonium phosphomolybdate by precipitating under specific conditions the molybdenum dissolved in an organic medium by the use of aqueous ammonium phosphate as the precipitating agent. In particular, the invention relates to recovering molybdenum from the distillate bottoms fraction of the reaction product of a molybdenum catalyzed epoxidation process.

It is an object of this invention therefore to provide a method for the recovery of molybdenum from organic solutions containing dissolved molybdenum compounds.

It is another object of this invention to provide a method for the recovery of molybdenum as ammonium phosphomolybdate from the reaction product obtained in the epoxidation of olefinic compounds utilizing organic soluble molybdenum compounds as the catalyst.

It is a specific object of this invention to recover molybdenum from the reaction product of a propylene epoxidation process utilizing organic soluble molybdenum compounds as the catalyst.

Other objects of this invention will be apparent from the description of the preferred embodiments and from the claims.

DESCRIPTION OF THE PREFERRED EMBODIMENTS

Although the method of this invention is generally applicable to the recovery of molybdenum from organic solutions thereof, in a preferred embodiment of this invention the molybdenum is recovered from an epoxidation reaction product. Recovery of molybdenum for direct reuse in the process or for resale to a metallurgical processor provides a significant economic savings in catalyst cost for such processes. In the preferred embodiment an olefinically unsaturated compound is epoxidized utilizing a soluble molybdenum catalyst together with an organic hydroperoxide as the oxidizing agent. An oxirane compound is produced by this reaction. The reaction product is distilled to remove the unreacted olefinically unsaturated compound, the oxirane product and most of the alcohol resulting from the reduction of the organic hydroperoxide.

The residue or bottoms fraction after the distillation contains unreacted organic hydroperoxide, a small amount of the alcohol resulting from the reduction of the hydroperoxide, high molecular weight polymeric compounds including high molecular weight polyhydric compounds, acidic compounds and used molybdenum catalyst. The portion of this bottoms fraction not required for catalyst production is treated with aqueous ammonium phosphate either in a batch process or preferably in a continuous, stirred reactor to which both the aqueous ammonium phosphate and the molybdenum containing stream are added. The effluent from the reactor is filtered by the use of a filter press or a continuous rotating drum filter of conventional design or by other conventional appropriate solid-liquid separating means.

In order to obtain a high percentage recovery of molybdenum from the stream the mole ratio of ammonium phosphate to molybdenum should be in excess of about 0.8 to 1, and preferably between 1.0 to 1 and 2.0 to 1. A reaction time of one-half hour is sufficient and additional time has little effect on the percentage recovery of molybdenum. In a continuous reactor good contact should be obtained between the molybdenum containing stream and the aqueous ammonium phosphate stream. A 10 weight percent solution of ammonium phosphate has been found to be a convenient concentration. Other concentrations may be employed, for example a 5 weight percent solution or a 20 weight percent solution. Higher and lower concentrations may be used but are not preferred.

The example which follows demonstrates the effect of ammonium phosphate to molybdenum mole ratio.

Example I.—The charge material or feed to the reaction was prepared by heating at reflux temperatures a mixture of 0.8 part by weight of molybdenum powder, 85 parts by weight of tertiary butyl alcohol, 10 parts by weight of tertiary butyl hydroperoxide and 5 parts by weight of propylene glycol. After refluxing for about one hour the mixture was filtered and the filtrate diluted with tertiary butyl alcohol containing small amounts of formic acid, propylene glycol and high molecular weight glycols. The molybdenum content of the diluted mixture was 2900 p.p.m. In each of the batch runs shown in Table I a portion of the above described feed was employed utilizing a treating temperature of 75° F. with a contact time of one-half hour. A 10 weight percent aqueous ammonium phosphate solution was used for each run. The mole ratio of ammonium phosphate to molybdenum and results obtained in each run are set forth in Table I.

TABLE I

| Run No. | 1 | 2 | 3 | 4 | 5 |
|---|---|---|---|---|---|
| Mol ratio (NH$_4$)$_3$PO$_4$/Mo | 0.17 | 0.42 | 0.83 | 1.25 | 1.67 |
| Mo content of treated solution, p.p.m. | 2,750 | 1,720 | 600 | 330 | 200 |
| Wt. percent removal of Mo from solutiong | 5 | 40.5 | 79.3 | 88.6 | 93.1 |
| Wt. percent Mo in solids | | 45 | 40.5 | 37.5 | 33.5 |
| Relative catalyst savings | 0.13 | 0.58 | 1.0 | 1.04 | 1.0 |

The relative catalyst savings in this table are calculated as the value of the molybdenum recovered based on the cost of the ammonium phosphate reagent required and process cost. It will be seen that as the mole ratio of ammonium phosphate to molybdenum increases the percent removal of molybdenum from solution also increases, however, at a mole ratio of 1.25 the recovery is at optimum efficiency based on the value of the ammonium phosphate required and processing costs. At higher mole ratios the increase in value for the molybdenum recovered is not sufficient to overcome the increase in the cost of the ammonium phosphate required to obtain the higher recoveries.

It has also been found that the ammonium phosphate solution can be made from mono- or di-basic ammonium phosphate in amounts corresponding to the tribasic material (NH$_4$)$_3$PO$_4$ which has heretofore simply been referred to as ammonium phosphate. Di- and tri-basic are the preferred compounds. If the stream to be treated has a high pH, above 7, an organic acid such as formic acid, acetic acid or the like can be utilized to reduce the pH since it is preferable that the molybdenum be precipitated from a slightly acidic solution, generally at a pH of 5 or less. All of the precipitations shown in the examples were carried out at a pH of less than 5 and frequently below 3.

The temperature required for effective treatment depends to a considerable extent upon the nature of the charge material containing the molybdenum. Charge materials having high molecular weight and high concentration of hydroxy compounds such as polymeric hydroxy compounds or a high concentration of polyethers require higher temperatures. In Example II this effect is shown.

Example II.—Bottoms fractions were obtained from the reaction product of a propylene epoxidation process utilizing a soluble molybdenum catalyst prepared as described in Example I and tertiary butyl hydroperoxide as the oxidizing agent. These bottoms fractions were obtained by distilling off the unreacted propylene, propylene oxide product and most of the tertiary butyl alcohol produced by the reduction of the tertiary butyl hydroperoxide. The compositions for the various samples which were obtained from various epoxidation runs are shown in Table II. The polymeric compounds were predominantly polymeric hydroxy compounds and polyethers. The "low" molecular weight polymeric compounds averaged about 110 and the "high" molecular weight compounds averaged about 300.

TABLE II

| Run No. | 6 | 7 | 8 | 9 | 10 | 11 | 12 |
|---|---|---|---|---|---|---|---|
| Feed composition: | | | | | | | |
| Molybdenum, p.p.m. | 2,800 | 2,800 | 880 | 1,370 | 1,370 | 1,370 | 1,370 |
| Conc. of polymeric compounds, wt. percent | 40.4 | 40.4 | 53.3 | 81.2 | 81.2 | 81.2 | 81.2 |
| Relative mol. wt. | Low | Low | High | High | High | High | High |
| Treatment Conditions: | | | | | | | |
| Temp., ° F. | 75 | 150 | 75 | 75 | 150 | 235 | 300 |
| (NH$_4$)$_3$PO$_4$/Mo, mols/mol | 1.05 | 1.05 | 1.5 | 1.25 | 1.25 | 1.25 | 1.25 |
| Concentration of (NH$_4$)$_3$PO$_4$ solution weight percent | 10 | 10 | 10 | 10 | 10 | 10 | 10 |
| Treated stream (after Mo removal): | | | | | | | |
| Molybdenum, p.p.m. | 400 | 370 | 268 | 1,340 | 1,160 | 310 | 160 |
| Percent removal of Mo | 85.7 | 86.8 | 69.5 | 2.5 | 15.5 | 77.4 | 88.4 |

It will be seen from these results that the temperature required rises with increase in molecular weight of the polymeric compounds and also with increase in concentration of these compounds. Thus the highest temperatures are required when high concentrations of high molecular weight compounds are present. In general, contacting temperatures in the range of from 75° F. (room temperature) to 300° F. are suitable for the process of this invention.

It has also been found that the water content of the total charge being treated is a factor in the removal of molybdenum. Thus with a feed having a water content (including the water introduced with the aqueous ammonium phosphate solution) of 2.5 weight percent the percent molybdenum removed was 63, with 4.5 it was 82 and with 7.5 it was 60. Thus there is an optimum intermediate level of water concentration of from about 4 to 5 weight percent. It is thought that at lower water contents the precipitation is from the single liquid phase and interphase mass transfer is poor. At the higher water contents the more soluble forms of ammonium phosphomolybdate are solubilized and thus the molybdenum recovery is lower.

I claim:
1. The method for recovering molybdenum from a molybdenum-containing organic solution obtained from the bottoms fraction of the reaction product of an organic soluble molybdenum compound catalyzed olefin epoxidation process which comprises contacting the molybdenum-containing organic solution with an aqueous ammonium phosphate solution in an amount such that the mole ratio of ammonium phosphate to molybdenum is in the range of from 0.8:1 to 2.0:1 and the cencentration of water is in the range of from about 4 to 5 weight percent based on the weight of said molybdenum-containing organic solution and said ammonium phosphate solution, thereby precipitating ammonium phosphomolybdate and recovering the ammonium phosphomolybdate.

2. The method according to claim 1 wherein the olefin epoxidation process is a propylene epoxidation process.

References Cited

UNITED STATES PATENTS 3,067,008  12/1962  Pilloton _____ 23—140
3,180,703  4/1965  Ableson et al.

HERBERT T. CARTER, Primary Examiner

U.S. Cl. X.R.

23—51